United States Patent
Dietz et al.

(10) Patent No.: US 12,227,450 B2
(45) Date of Patent: Feb. 18, 2025

(54) STUCCO PROPERTIES THROUGH AGING AT ELEVATED TEMPERATURES AND HIGH HUMIDITY LEVEL

(71) Applicant: Knauf Gips KG, Iphofen (DE)

(72) Inventors: Stephan Dietz, Pretzfeld (DE); Alexander Hartmann, Kleinlangheim (DE); Thomas Fraser, Altona (AU); Manfred Baier, Iphofen-Nenzenheim (DE); Sebastian Förthner, Fürth (DE); Stergios Karakoussis, Laubach (DE); Georgi Paraskov, Nuremberg (DE); Reiner Schneiderbanger, Knetzgau (DE)

(73) Assignee: Knauf Gips KG, Iphofen (DE)

( * ) Notice: Subject to any disclaimer, the term of this patent is extended or adjusted under 35 U.S.C. 154(b) by 291 days.

(21) Appl. No.: 16/636,604

(22) PCT Filed: Aug. 4, 2017

(86) PCT No.: PCT/EP2017/000946
§ 371 (c)(1),
(2) Date: Feb. 4, 2020

(87) PCT Pub. No.: WO2019/024971
PCT Pub. Date: Feb. 7, 2019

(65) Prior Publication Data
US 2020/0385309 A1    Dec. 10, 2020

(51) Int. Cl.
*C04B 11/00* (2006.01)
*C04B 28/14* (2006.01)
*C04B 103/50* (2006.01)
*C04B 111/00* (2006.01)
*C04B 111/60* (2006.01)

(52) U.S. Cl.
CPC .......... *C04B 11/007* (2013.01); *C04B 28/145* (2013.01); *C04B 2103/50* (2013.01); *C04B 2111/0062* (2013.01); *C04B 2111/00672* (2013.01); *C04B 2111/60* (2013.01)

(58) Field of Classification Search
CPC . C04B 11/007; C04B 28/145; C04B 2103/50; C04B 2111/0062; C04B 2111/00672; C04B 2111/60; C04B 2111/00482; C04B 11/036; C04B 11/00; C04B 28/14; C04B 38/106; C04B 28/147; C04B 28/16
See application file for complete search history.

(56) References Cited

U.S. PATENT DOCUMENTS

| | | | |
|---|---|---|---|
| 2,177,668 A | 10/1939 | Co | |
| 2,310,023 A * | 2/1943 | Gardner | C04B 28/14 106/730 |
| 3,527,447 A | 9/1970 | Co | |
| 4,201,595 A * | 5/1980 | O'Neill | C04B 40/0028 156/39 |
| 2008/0135072 A1* | 6/2008 | Bold | B01F 35/92 134/107 |
| 2016/0340244 A1* | 11/2016 | Biguenet | C04B 11/007 |

FOREIGN PATENT DOCUMENTS

| | | | | |
|---|---|---|---|---|
| DE | 553519 C | 6/1932 | | |
| DE | 19627250 A1 * | 1/1998 | ......... | C04B 11/036 |
| EP | 1547984 A1 | 6/2005 | | |
| EP | 2894135 A1 | 7/2015 | | |

OTHER PUBLICATIONS

DE-19627250-A1, machine translation (Year: 1998).*
Libretexts [retrieved from internet at Jun. 7, 2022 from <URL:https://batch.libretexts.org/print/url=https://phys.libretexts.org/Bookshelves/College_Physics/Book%3A_College_Physics_(OpenStax)/13%3A_Temperature_Kinetic_Theory_and_the_Gas_Laws/13.06%3A_Humidity_Evaporation_and_Boiling.pdf>] (Year: 2015).*
Written Opinion of the International Search Authority, PCT/EP2017/000946 dated Feb. 7, 2019, downloaded from the WIPO web site.

* cited by examiner

*Primary Examiner* — Anthony J Green
*Assistant Examiner* — Marites A Guino-O Uzzle
(74) *Attorney, Agent, or Firm* — Mark Terry

(57) ABSTRACT

The invention pertains to a method for stabilizing stucco wherein
 a fresh stucco is provided;
 water is added to the fresh stucco to obtain moistened stucco, and
 the moistened stucco is maintained at a temperature of at least 30° C. for a time interval of at least 30 minutes to obtain a stabilized stucco.

The process allows inter alia for an easy adjustment of the activity of the stabilized stucco, which is useful to e.g. adjust setting time of a corresponding stucco slurry. The invention further pertains to a method for producing gypsum plasterboards, wherein a stabilized stucco obtained with the above method is used.

7 Claims, No Drawings

STUCCO PROPERTIES THROUGH AGING AT ELEVATED TEMPERATURES AND HIGH HUMIDITY LEVEL

The invention pertains to a process of stabilizing fresh stucco. Further, the invention pertains to a method of producing gypsum plasterboards.

Gypsum in its most stable form as present in natural sources is calcium sulfate dihydrate ($CaSO_4.2H_2O$). For industrial production, gypsum is won from quarries and is then processed to obtain stucco as material valuable e.g. in construction of buildings. Gypsum mined from natural sources usually has a purity of at least 80 wt. % calcium sulfate dihydrate (DH; $CaSO_4.2H_2O$) and usually contains limestone, clays or other minerals as impurities. Gypsum deposits are widely spread around the globe and roughly 6.600 spots are known today.

A further important source for gypsum is flue gas desulphurization (FGD). By treatment of flue gases with $CaCO_3$, sulfur compounds present in the flue gas are precipitated as calcium sulfate dihydrate. Such FGD gypsum is widely used as a gypsum source in the production of gypsum plasterboards.

Calcium sulfate is available in various modifications that differ in the amount of water bound in the crystal lattice.

Upon thermal treatment water dissociates from calcium sulfate dihydrate to yield metastable calcium sulfate hemihydrate (HH; $CaSO_4.0.5H_2O$). Upon continued heat treatment anhydrite III (A-III; $CaSO_4$) is obtained which reversibly may absorb water to be transformed into the hemihydrate. The reversible uptake of water liberates considerable amounts of reaction heat. Whether anhydrite III or calcium sulfate hemihydrate is formed during calcination is depending on the calcining temperature, the vapor pressure and the residence time in the calcining ambience. Stucco is a variety of calcium sulfates that consists mainly of β-hemihydrate but also contains lower amounts of other calcium sulfate mineral. The term is commonly used for the product of calcination in kettles without vapor pressure control.

Anhydrite II (A-II s) is the completely dehydrated form of calcium sulfate. It is formed at higher temperatures and is hardly soluble in water. Due to its low solubility and reactivity Anhydrite II is not desired, when stucco is produced for e.g. gypsum plasterboard production.

Calcination of gypsum in order to produce stucco is performed under dry conditions by direct treatment in hot gases or indirectly in a heated treatment vessel. From state of the art a variety of calcining methods and processes are known. Recently, due to their low investment cost and compact structure, flash calciners became more and more common. As the name implies, the exposure time of the gypsum in these aggregates is very short, usually within a range of several seconds. The stucco produced by this method is very reactive and has short setting times and a high water demand when mixed with water. Calcination methods using indirect heating, for example in a kettle process, are more gentle due to much longer exposure times. The produced stucco is less reactive.

Thus, the conditions applied by calcination have a strong influence on the nature of the stucco. In particular the amount of water required for further processing the gypsum, the followability of the gypsum slurry and the setting behavior are influenced by the conditions applied during calcination.

During calcination the size and shape of the calcium sulfate dihydrate particles is essentially preserved. However, since water molecules diffuse from the crystal lattice and physically bound water is desorbed from the surface of the calcium sulfate particles, fissures form in the particles and the particles become porous and brittle. Further, in particular during flash calcination, the calcium dihydrate particles experience inhomogeneous conditions throughout their volume due to the short processing time in the flash calciner. Whereas in parts on the outer surface of a calcium sulfate mineral particle water can quickly diffuse and leave the particle, in inner parts of the volume it will take more time to mobilize the bound water molecules. After calcination the stucco particle therefore might have an inhomogeneous composition and may comprise e.g. anhydrite III in the shell parts of the particle besides calcium sulfate hemihydrate in its core parts. The calcination process is usually controlled such that the fresh product no longer comprises dihydrate. Dihydrate may act as crystal nucleus and therefore cause very short setting times in processing of the hemihydrate after addition of water.

Gypsum is used in manifold applications, e.g. in the production of gypsum plasterboards, gypsum fiberboards, wall plaster, as floor screed, for modelling, to mention only a few of them. For all these applications, a particular performance of the stucco is desired. For example, in the production of gypsum plasterboards a short setting time is important to be able to quickly process the boards ribbon after application of the plaster slurry onto a liner, especially to cut the board ribbon into individual boards. When used for floor screed, it is desired to have a good flowability of the gypsum slurry while simultaneously having a low water demand in order to obtain a floor with a smooth surface and high strength. When used for plaster the stucco has to be easily retarded so that a defined working time can be adjusted.

For setting, the stucco is mixed with water to obtain a slurry. The stucco is dissolved in the water phase to form an over-saturated calcium sulfate solution with regard to the dihydrate. Since the solubility of the dihydrate is lower than that of the hemihydrate, 2.7 g/l vs. 8 g/l, crystal seeds quickly form and calcium sulfate dihydrate precipitates from the saturated solution. During setting the calcium sulfate therefore is recrystallized, and is solidifying in the process. The dihydrate crystallizes in the form of needles which form a porous but stable structure. After setting, excess water comprised in the slurry remains in the pores of the set gypsum and has to be removed. For example, drying of gypsum plasterboards requires heat in order to evaporate the excess water and a corresponding amount of fuel is required to generate the required heat. To save costs and to reduce processing time it is therefore desired to use as little water as necessary for the process.

To reduce the amount of water required for the setting process, the stucco is stabilized after calcination by addition of a small amount of water. This process is also known as "forced aging" of gypsum and is commonly used. Anhydrite III contained in the stucco after calcination is transformed to calcium sulfate hemihydrate. During aging crystal defects are healed and fine particles are agglomerated. The specific surface area of the stucco is lowered thereby reducing the need for water when forming a slurry. This "forced aging" is executed in a blender wherein water in liquid or vaporous form is applied to the stucco. After aging, the stabilized stucco can be further processed by addition of water for preparation of a slurry.

In particular during flash calcination the gypsum particles experience stress and become quite unstable due to formation of fissures in the gypsum particles. Upon application of water the stucco particles disintegrate with formation of a huge amount of very fine particles thereby increasing the water demand of the stucco, i.e. the amount of water necessary to prepare a gypsum slurry. This also has an impact on the rheology of the calcium sulfate slurry. The flowability of the slurry, at a given amount of water comprised in the slurry, is reduced. Therefore, a high amount of hyper stoichiometric water is required for processing of the slurry, which after setting has to be removed again by drying.

During aging, the particle size of the calcium sulfate hemihydrate particles is increased by agglomeration, whereas the surface area is decreased and crystal defects are healed. As a consequence, dissolution of the calcium sulfate hemihydrate particles in the slurry is slowed down thereby increasing the setting time. In the production of gypsum plasterboards this effect undesireable. In order to achieve a high throughput the setting of the gypsum has to be performed fast and in a controlled, reproducible manner. This ensures a good adhesion of the top liner and gypsum plasterboards of constant quality are obtained. Fluctuations in the properties of the stucco have a negative impact on the steadiness of gypsum plasterboard production, since they result in fluctuations of the setting time.

For safe process control or to adjust performance of the set gypsum ($CaSO_4.2H_2O$), chemical additives can be used. For acceleration of the setting process, ground gypsum particles ($CaSO_4.2H_2O$) can be added that act as seed crystals. Potassium and aluminum sulfates can be added as chemical accelerators. Chelating agents may be added to retard the hydration process. Such chelating agents interfere with the chemical activity of calcium ions. Typical retarders are citric acid, tartaric acid or polycondensed amino acids. Such retarders are commercially available on the market and are offered for example under the trademarks PPE® or Retardan® (Sika A G, Baar, C H). However, those chemicals cause additional costs and may effect e.g. corrosion to the equipment.

Aging of stucco after calcination is used since long time. Continuous improvements have been made to further reduce water demand and to improve processability of the stucco.

In U.S. Pat. No. 2,177,668 a process of rapidly and artificially aging stucco is described. Water is applied in the form of vapor carried by a suitable gas to which the stucco is exposed. During this process, the stucco is agitated in such a manner that it is exposed to the gas carrying the available moisture, and the moisture is taken up by the gypsum and chemically combined with each particle of the stucco. For treatment, the gas may be maintained at about 40° C. The stucco is exposed in a blender at fairly rapid agitation. During treatment the temperature raises from about 12° C. to about 70° C. within 10 minutes. Total processing time is about 1 hour and 15 minutes.

In U.S. Pat. No. 4,153,373 is described a process for preparing stucco that has a low water demand. The stucco is fed to a blender, with the stucco entering the blender container near the top thereof. Water is added to the stucco immediately after it enters the blender container, said water being incorporated into the stucco in the form of a free-falling, continuous stream of water which does not directly contact the sidewall of the container or a rotating propeller located in the bottom of said container. The wetted stucco is swept downward and around the sidewall of the blender container, is then passing around the rotating propeller to then exit the blender through an exit port located in the sidewall of the container.

In WO 2008/074137 is described a process for treating beta calcium sulfate hemihydrate, wherein the beta calcium sulfate hemihydrate is exposed to steam at a pressure above atmospheric pressure. The water demand of a beta calcium sulfate hemihydrate may be reduced by up to 40%. The reduction in water demand can be enhanced with increased steam temperature and pressure. The initial stucco temperature is between 60° C. and 200° C. and the residence time of the stucco in the steam atmosphere is between 5 and 900 seconds.

The gypsum raw material used in a stucco production comprises contaminants in a range of about up to 20 wt. %, like e.g. limestone, clay and other minerals. This causes fluctuations in the quality of the stucco and in the slurry produced therefrom. Further, the stucco should fulfil two important requirements:
1. The stucco should have a low water demand for preparation of a slurry to minimize the energy need for drying e.g. the gypsum plasterboard after setting;
2. The stucco should have sufficient reactivity to allow for short setting times in the production of e.g. gypsum plasterboards.

Both requirements are basically contrary to each other, since a low water demand requires stable gypsum particles having a low specific surface area and low inclination to grain disintegration. However, such stucco has a lower activity and thus, setting of the slurry is slow. For stucco having a low water demand a high healing rate is desired during forced aging whereas for high reactivity stucco a smaller particle size with a high specific surface area is advantageous and the healing rate can be kept low.

The problem to be solved by the claimed invention is to provide a process for stabilizing stucco that allows an adjustment of the activity of the stabilized stucco for further processing, such that the setting time can be adjusted as desired. In particular the setting time shall be adjustable to a short setting time as required e.g. in plasterboard production, wherein the obtained stabilized stucco at the same time has a low water demand. The process should allow for adjusting the quality of the stabilized stucco in a reliable and reproducible manner, and wherein fluctuations, e.g. in the quality of the gypsum used as raw material for calcination, can be compensated.

This problem is solved by a process as defined in claim 1. Preferred embodiments are defined in the depending claims.

The inventors have found that by maintaining a fresh stucco after addition of a small amount of water for a prolonged time at elevated temperature, a stabilized stucco can be obtained. The reactivity of the stabilized stucco is sufficient for use e.g. in the production of gypsum plasterboards. At the same time the water demand of the stabilized stucco is very low.

According to the invention a method is provided for stabilizing fresh stucco wherein
a fresh stucco is provided;
water is added to the fresh stucco to obtain a moistened stucco, and
the moistened stucco is maintained at a temperature of at least 30° C. for a time interval of at least 30 min to obtain a stabilized stucco.

A fresh stucco is understood to be a calcium sulfate material consisting mainly, i.e. to more than 60 wt. %, of β-hemihydrate as obtained by calcination of gypsum according to processes known in the state of the art. The gypsum used for calcination can according to an embodiment be gypsum as mined from a quarry or a FGD-gypsum.

The fresh stucco comprises calcium sulfate hemihydrate as main component besides smaller amounts of other gypsum phases, such as anhydrite III, and impurities, e.g.

minerals, and is obtained by calcination of gypsum. The material has a high water demand and a high activity due to the high surface area of the stucco particles. The stucco can be provided to the process having a high temperature caused by the heat still comprised in the material from the calcination treatment.

However, the fresh stucco can also be cooled before further treatment, e.g. when the fresh stucco is stored before further processing. It is preferred that the fresh stucco is processed immediately after calcination, i.e. when still hot.

According to an embodiment, the fresh stucco is provided at a temperature of less than 100° C., according to a further embodiment at a temperature of less than 99° C., according to still a further embodiment at a temperature of less than 90° C. and according to a still further embodiment at a temperature of less than 80° C. To adjust temperature, the fresh stucco can be cooled. Cooling can be performed in a suitable cooling equipment, wherein the fresh stucco according to an embodiment is agitated to facilitate removal of heat. However, cooling of the fresh stucco to a desired temperature may also be achieved by a simple rest period, wherein the heat comprised in the fresh stucco is released into the surroundings.

According to an embodiment the fresh stucco is provided at a temperature of at least 40° C., according to an embodiment the fresh stucco is provided at a temperature of at least 50° C., according to an embodiment the fresh stucco is provided at a temperature of at least 60° C., and according to an embodiment the fresh stucco is provided at a temperature of at least 65° C.

A moistened stucco is understood to be a fresh stucco to which water has been added such that stabilization of the stucco is initiated. A moistened stucco therefore has a higher water content than fresh stucco. The water is not only present in a form bound in the crystal structure by coordinative bounds (water of crystallization) but is also present in adsorbed form. The adsorbed water can be removed from the moistened stucco by moderate heating (e.g. about 100 to 110° C.). The moistened stucco can already have experienced stabilization processes, e.g. recrystallization processes or agglomeration of smaller particles to obtain larger particles thereby lowering the specific surface area of the stucco. The water demand of a moistened stucco is lower than that of a fresh stucco as obtained directly after calcination due to initiation of healing processes in the crystal lattice occurring already immediately after the addition of water.

Due to water uptake anhydrite III comprised in the fresh stucco is quickly transformed into calcium sulfate hemihydrate. The moistened stucco therefore comprises a lower amount of anhydrite III than the fresh stucco as fresh from calcination and according to an embodiment comprises no anhydrite III at all.

The water demand is understood as the minimum amount of water that has to be added to the fresh stucco to obtain a defined flow behavior.

The water demand can be determined by preparing a slurry of the stucco in water and determining the flow value of the slurry when the slurry is poured onto a flat surface. A method for determination of the flow value is explained below in the examples.

A stabilized stucco is understood to be a stucco obtained from a moistened stucco that has been processed by the claimed method and has an activity lower than the fresh stucco and the moistened stucco. The stabilized stucco has at least one of a lower specific surface as determined by BET-method, a greater particle size due to agglomeration, a lower water demand and/or a longer setting time than the fresh stucco and the moistened stucco.

Activity of a stucco can be determined by determination of the setting time of a slurry of a stucco. According to an embodiment, the stabilized stucco has a specific surface area as determined by the BET-method of 2.5 to 5.0 $m^2/g$. A method for determination of the specific BET-surface is described in the examples.

According to an embodiment, after treatment of the fresh stucco by the method according to the invention, the BET specific surface area of the stabilized stucco is at least 5 smaller than the BET specific surface area of the fresh stucco. According to a further embodiment, the BET specific surface area of the stabilized stucco is at least 8%, and according to a still further embodiment is at least 10% smaller than the BET specific surface area of the fresh stucco. According to an embodiment the BET specific surface area of the stabilized stucco is at most 50% smaller, according to an embodiment at most 40% smaller than the BET specific surface area of the fresh stucco.

According to an embodiment, the stabilized stucco has a flow value as determined by the method described in the examples of 300 to 400 mm, according to a further embodiment of 320 to 390 mm.

In the process of the invention, the fresh stucco according to an embodiment may be provided having a low temperature, e.g. at room temperature. For executing the method of the invention, the fresh stucco is then heated to the selected temperature of at least 30° C.

The fresh stucco as obtained directly after calcination and used as a starting material in the process of the invention comprises calcium sulfate hemihydrate ($CaSO_4.0.5H_2O$) as the main component. According to an embodiment, the fresh stucco contains at least 60 wt. %, according to a further embodiment at least 80 wt. % and according to a still further embodiment at least 85 wt. % calcium sulfate hemihydrate. According to an embodiment, the fresh stucco comprises less than 100 wt. % calcium sulfate hemihydrate. According to a further embodiment the fresh stucco contains less than 98 wt. %, according to a still further embodiment, less than 95 wt. % calcium sulfate hemihydrate.

Apart from calcium sulfate hemihydrate the fresh stucco can also contain calcium sulfate anhydrite III ($CaSO_4$) in smaller amounts. The amount of anhydrite III is depending on the conditions applied during calcination of the gypsum. For economic reasons the amount of anhydrite III comprised in the fresh stucco is tried to be kept low to minimize energy consumption during calcination. However, due to inhomogeneity in the composition of the gypsum used for calcination as well as to inhomogenities in the reaction conditions a particular gypsum particle experiences during calcination the fresh stucco can also comprise anhydrite III.

According to an embodiment, the fresh stucco comprises more than 0 wt. % anhydrite III, according to a further embodiment more than 0.5 wt. % anhydrite III, according to a further embodiment more than 3 wt. % anhydrite III, according to a further embodiment comprises more than 5 wt. % anhydrite III, and according to a still further embodiment comprises more than 8 wt. % anhydrite III. Basically, it is possible to execute the method of the invention with a fresh stucco that comprises anhydrite III as the main component, since anhydrite III is transformed to calcium sulfate hemihydrate in the course of the claimed method. Due to economic reasons, the amount of anhydrite III is, however, preferably kept as low as possible. According to an embodiment, the fresh stucco comprises less than 100 wt. % anhydrite III, according to a further embodiment comprises less than 50 wt. % anhydrite III, according to a further embodiment comprises less than 40 wt. % anhydrite III, according to a further embodiment comprises less than 30 wt. % anhydrite III, and according to a further embodiment comprises less than 20 wt. % anhydrite III.

The fresh stucco according to an embodiment can comprise low amounts of calcium sulfate dihydrate ($CaSO_4$ $2H_2O$). However, since calcium sulfate dihydrate strongly influences setting time of the stucco, the amount of calcium sulfate dihydrate comprised in the fresh stucco usually is kept low. Further, to avoid setting of the fresh stucco when the method according to the invention is carried out, the amount of calcium sulfate dihydrate comprised in the fresh stucco is preferably kept low. According to an embodiment, the fresh stucco contains less than 5 wt. %, according to a further embodiment contains less than 2 wt. %, according to a further embodiment contains less than 1 wt. % and according to a still further embodiment contains less than 0.5 wt. % calcium sulfate dihydrate. According to a further embodiment the fresh stucco comprises no calcium sulfate dihydrate at all.

The percentages of calcium sulfate hemihydrate, anhydrite III and calcium sulfate dihydrate refer to the total amount of calcium sulfate hemihydrate, anhydrite III and calcium sulfate dihydrate comprised in the stucco.

The amounts of calcium sulfate hemihydrate, calcium sulfate anhydrite III, calcium sulfate dihydrate, and calcium sulfate anhydrite II can be determined by suitable methods known in the state of the art. A suitable method is described in the examples. As an alternative, X-ray diffraction can be used for analysis. Preferably, the method described in the examples is used for determination.

Besides calcium sulfate dihydrate and anhydrite III, the fresh stucco can comprise impurities as well as fillers. The impurities originate from the gypsum used for calcination. An impurity is understood to be every compound in the gypsum that cannot be transformed to calcium sulfate hemihydrate or anhydrite III during calcination. Exemplary impurities are sand, clay, limestone, magnesium sulfate, dolomite, etc. Anhydrite II, i.e. naturally occurring anhydrite, can also be comprised in the fresh stucco as an impurity. Fillers are materials that are added to the gypsum before or after calcination to adjust characteristics of the fresh or the stabilized stucco. Exemplary fillers are limestone, clays, and natural anhydrite.

Impurities as well as fillers, according to an embodiment, are comprised in the fresh stucco in total in an amount of less than 50 wt. %, according to a further embodiment in an amount of less than 40 wt. %, according to a further embodiment in an amount of less than 30 wt. % and according to a still further embodiment, in an amount of less than 20 wt. %. According to an embodiment, the fresh stucco comprises no impurities or fillers at all. According to a further embodiment fresh stucco comprises more than 1 wt. % of impurities/fillers, and according to a further embodiment comprises more than 5 wt. % of impurities/fillers.

The percentages mentioned above refer to a fresh stucco sample that has been dried at elevated temperature until constant weight. According to an embodiment, the elevated temperature is selected to be at least 40° C., according to a further embodiment at least 60° C. and according to an embodiment is selected less than 100° C. According to an embodiment, the sample is dried at 100° C. until constant weight. According to an embodiment, the sample is dried in a drying oven. After drying the sample is cooled in an desiccator. During weighing access of humidity is avoided.

According to an embodiment, the fresh stucco comprises water in an amount of less than 9 wt. %, according to an embodiment comprises water in an embodiment of less than 6 wt. %. The percentages correspond to the parameter "loss on ignition" (LOI). The amount of water comprised in the fresh stucco mainly corresponds to the water bound as calcium sulfate hemihydrate.

The fresh stucco, according to an embodiment, has a particle size ($D_{98}$) of less than 5 mm, according to a further embodiment of less than 3 mm and according to a still further embodiment of less than 1 mm.

According to a further embodiment, the fresh stucco has a particle size ($D_{80}$) of less than 1 mm, according to a further embodiment of less than 500 µm and according to a still further embodiment of less than 200 µm. According to an embodiment, the particle size ($D_{80}$) is at least 50 µm.

According to a further embodiment, the fresh stucco has a particle size ($D_{50}$) of less than 200 µm, according to a still further embodiment of less than 100 µm. According to an embodiment, the particle size ($D_{50}$) is at least 5 µm.

A particle size "$D_{80}$" means that at least 80 wt. % of the material has a particle size of less than a particular size "D". Accordingly, a particle size "$D_{50}$" means that at least 50 wt. % of the material has a particle size of less than a particular size "D" and a particle size "$D_{98}$" means that 98 wt. % of the material has a particle size of less than a particular size "D". The particle size "$D_x$" is determined by methods known in the state of the art. For a particles size of more than 32 µm the particle size distribution can be determined by sieving a sample through a sieve of a particular mesh size and then weighing the amount of material that has passed the sieve and the amount of material remaining on the sieve. Preferably, the particle size distribution is determined by laser diffraction which also works for smaller particle sizes.

Calcination can be performed by direct or indirect methods as known in the state of the art using known equipment. The calcination can be performed by batch calcination or by a continuous calcination process. In particular, calcination can be performed by flash calcination.

The temperature applied during calcination is depending on the method and the equipment used for calcination. Whereas calcination performed in kettles can be performed at lower temperatures, e.g. at temperatures within a range of 120° C. to 160° C., flash calcination requires higher temperatures due to the shorter contact time between the gypsum particles and the hot gases used for calcination. The temperature for flash calcination is usually selected to be up to 200° C. The temperature refers to the temperature of the hot gas at the entry of the calcination aggregate. Calcination conditions are selected such that a fresh stucco as described above is obtained.

The fresh stucco is then contacted with a small amount of water to obtain moistened stucco.

According to an embodiment, the fresh stucco is introduced into a blender and is agitated while water is added to obtain moistened stucco.

The water can be added in liquid form, wherein the water according to an embodiment is sprayed onto the fresh stucco.

According to another embodiment, the water is added to the fresh stucco in the vapor phase. According to an embodiment, the vapor has a temperature of at least 100° C., according to an embodiment has a temperature of at least 110° C. and according to still a further embodiment has a temperature of less than 150° C. According to a further embodiment, the vapor has a temperature of less than 200° C. According to an embodiment, the vapor and the fresh stucco are contacted at ambient pressure. Suitable nozzles can be provided in the blender for introducing vapor or liquid water into the blender.

According to an embodiment, water is added in liquid and vapor form. By adding water in liquid as well as in vapor form the temperature of the moistened stucco can be adjusted and excessive wetting of the moistened stucco can be avoided.

During blending the temperature of the fresh stucco/moistened stucco is adjusted according to an embodiment to at least 30° C., according to an embodiment to at least 40° C., according to a further embodiment is adjusted to at least 50° C., according to a further embodiment is adjusted to at least 60° C. and according to still a further embodiment is adjusted to a temperature of at least 65° C. According to a further embodiment, the temperature of the fresh stucco is adjusted to less than 100° C., according to a further embodiment of less than 99° C., according to a further embodiment of less than 90° C., and according to a still further embodiment of less than 80° C. during blending.

According to an embodiment no active cooling/heating is performed during blending by a corresponding heating/cooling device. The temperature during blending can be adjusted by adjusting the temperature of the fresh stucco added to the blender and the amount of water added. Part of the water can be evaporated, thereby cooling the fresh stucco.

Blending of the fresh stucco and the water can be executed batchwise or continuously. In a continuously operating blender the fresh stucco and water are continuously introduced into the blender and moistened stucco is continuously discharged from the blender.

According to an embodiment, blending is performed until a homogeneous mixture of water and fresh stucco is obtained and basically no fluctuations in humidity throughout the volume of the moistened stucco are observed. However, according to a further embodiment it is sufficient to mix water and fresh stucco during a very short time period before further processing.

Blending time can be selected very short, e.g. within a range of few seconds. However, also longer blending times are suitable. According to an embodiment blending is performed for at least 1 second, according to an embodiment for at least 2 seconds. The duration of the blending procedure depends on the amount of fresh stucco processed and the type of blender used.

According to an embodiment, a continuous mixer is used. The blending time then corresponds to the residence time of the stucco particle while passing the blender. Suitable blenders are known form the state of the art. In such a type of continuous blender blending time according to an embodiment is less than 1 minute, according to a further embodiment less than 30 seconds.

According to another embodiment, a batchwise blender is used, wherein according to an embodiment, the blending time of fresh stucco and water is selected to be less than 5 minutes, according to an embodiment is less than 2 minutes.

However, depending of the amount of stucco processed, also longer blending times are possible.

After addition of water, and optionally blending, a moistened stucco is obtained.

The moistened stucco is maintained at a selected temperature of at least 30° C. for a time interval of at least 30 minutes to obtain a stabilized stucco.

According to an embodiment, the moistened stucco is transferred into a storing container.

According to an embodiment, the moistened stucco is obtained by blending water and fresh stucco in a blender and the moistened stucco is then transferred to a storing container.

According to another embodiment, the fresh stucco and water are directly introduced into the storing container without passing a blender. Blending of water and fresh stucco then occurs in the storing container.

According to an embodiment, the storing container is equipped with an agitating device to agitate the moistened stucco while the moistened stucco is kept at the selected temperature.

Preferably, however, the moistened stucco is not agitated while being maintained at the selected temperature.

While the moistened stucco is maintained at the selected temperature, healing processes occur and crystal defects, e.g. fissures in the particles of the stucco, are removed. The specific surface area of the moistened stucco decreases and the particles of the moistened stucco become physically and/or chemically more stable. The specific surface area can be measured according to the BET method.

Without wanting to be bound by theory it is presumed that new small calcium sulfate hemihydrate crystals form in the fissures and partly or totally fill those fissures, thereby reducing the surface area of the particle.

The temperature is adjusted to at least 30° C., according to a further embodiment is adjusted to at least 40° C., according to a further embodiment is adjusted to at least 50° C., according to a further embodiment is adjusted to at least 60° C., and according to a still further embodiment is adjusted to at least 65° C. According to a further embodiment, the temperature is adjusted to less than 100° C., according to a further embodiment to a temperature of less than 99° C., according to a further embodiment to a temperature of less than 90° C., and according to a still further embodiment to a temperature of less than 80° C.

According to an embodiment, temperature is adjusted by adjusting the temperature of the fresh stucco and/or the moistened stucco before the moistened stucco is introduced into the storing container.

To adjust temperature, the fresh stucco, according to an embodiment, can be cooled. Cooling can be performed in a suitable cooling equipment, wherein the fresh stucco according to an embodiment is agitated to facilitate removal of heat. However, cooling of the fresh stucco to a desired temperature may also be achieved by a simple rest period, wherein the heat comprised in the fresh stucco is released into the surroundings. As explained above, the temperature of the moistened stucco can be adjusted by adjusting the rate of the water added to the fresh stucco, and vice versa.

To keep the temperature at the selected level, the storing container, according to an embodiment, is equipped with an insulation to avoid loss of heat. Such insulation can be provided by surrounding the storing container with an insulation material.

According to an embodiment, the storing container can be equipped with a heating device for heating the moistened stucco to keep the moistened stucco at the selected temperature.

While the moistened stucco is kept at the selected temperature, the temperature may slightly decrease due to heat losses. The heat losses can, according to an embodiment, be compensated by heating or, according to another embodiment, the temperature loss can be compensated by selecting the temperature of the moistened stucco immediately after start of the stabilization process correspondingly higher.

The moistened stucco is kept at the selected temperature for at least 30 minutes. According to a further embodiment, the moistened stucco is kept at the selected temperature for at least 45 minutes. According to an embodiment the moistened stucco is kept at the selected temperature for at least 1 hour and according to a still further embodiment, the moistened stucco is kept at the selected temperature for at least 2 hours.

Surprisingly it has been found that by the longer storing time at the selected temperature, a stabilized stucco is obtained that has a low water demand and at the same time has sufficient activity to provide short setting time as required e.g. in gypsum plasterboard production.

According to a further embodiment, the moistened stucco is kept at the selected temperature for less than 48 hours, according to another embodiment for less than 24 hours, according to a further embodiment for less than 20 hours, according to further embodiment for less than 15 hours and according to a still further embodiment for less than 10 hours. The moistened stucco can be kept at the selected temperature for more than 24 hours. However, usually no further stabilization effect is observed.

The healing of the moistened stucco advances with duration of the heat treatment and activity of the stabilized stucco decreases, i.e. the setting time of the stabilized stucco after addition of water increases. The relative increase of an effect of stabilization decreases with time and converges to a limit value corresponding to maximum stabilization of the moistened stucco.

The process of maintaining the moistened stucco at the selected temperature therefore is terminated when the stucco has an activity desired for a particular application, e.g. production of gypsum plasterboards or as a mortar.

While the moistened stucco is maintained at the selected temperature for stabilization, loss of moisture to the surroundings should be kept low to allow progress of healing processes. According to an embodiment, the storing container is an airtight container such that moisture comprised within the moistened stucco is kept in the storing container.

While the moistened stucco is maintained at the selected temperature for stabilization, transformation of the calcium sulfate hemihydrate to calcium sulfate dihydrate should be avoided. Oversaturation of the atmosphere inside the container with water should be avoided due to condensation of liquid water, promoting the setting of parts of the stored hemihydrate. Liquid water can also induce corrosion of the container and other equipment. The relative humidity while the moistened stucco is kept at the selected temperature for stabilization therefore is selected according to an embodiment lower than 100%, according to a further embodiment lower than 90%. According to a further embodiment, the relative humidity within the storing container is selected higher than 50%.

The stability and the reactivity of the stabilized stucco can be adjusted according to an embodiment by adjustment of the temperature and/or the duration of the heat treatment.

When the treatment time, while the moistened stucco is kept at the selected temperature, is short, e.g. close to 30 minutes, a stabilized stucco of higher activity and shorter setting time is obtained comprising a higher amount of small calcium sulfate hemihydrate particles. Such stabilized stucco is e.g. useful in the production of plasterboards. Accordingly, at longer treating times stabilized stucco with a longer setting time is obtained.

The activity of the stabilized stucco can further be adjusted by adjusting the selected temperature at which the moistened stucco is maintained. As a general rule, a higher temperature results in a lower activity of the stabilized stucco and vice versa.

Advantageously, with the claimed method it is possible to adjust the activity of the stabilized stucco to a particular level by adjustment of the temperature and adjustment of the duration of the treatment of the moistened stucco. Fluctuations in the quality of the raw gypsum used for calcination therefore can be easily compensated for which is an important advantage, e.g. in continuous plasterboard production.

According to an embodiment, the activity of the stabilized stucco is determined. A suitable determination method is described in the examples. Setting time and rehydration can be used to evaluate activity of the stabilized stucco.

The amount of water added to the fresh stucco is selected such that sufficient water is available to initiate healing of the stucco particles. However, the amount of water is also selected such, that a reaction of the calcium sulfate hemihydrate and water to obtain calcium sulfate dihydrate is avoided.

According to an embodiment the amount of water added to the fresh stucco is selected such that the amount of free moisture comprised in the stabilized stucco is higher than 0.2 wt. %, according to a further embodiment is higher than 0.5 wt. %. According to a further embodiment, the amount of water added to the fresh stucco is selected such that the amount of water comprised in the moistened stucco is less than 3 wt. %, according to a further embodiment is selected less than 2 wt. % and preferably less than 1 wt. %. The percentages refer to the weight of the fresh stucco.

According to an embodiment, the water is added to the fresh stucco in vapor form (steam). The steam is introduced at a temperature of at least 100° C. and can also be used to warm up the fresh stucco to the selected temperature.

According to a further embodiment, the fresh stucco is provided at room temperature. After calcination, the fresh stucco can be stored, e.g. due to production capacity of the calciner or the storing container. The fresh stucco is then cooled and stored at room temperature before further processing.

Before further processing, the fresh stucco is, according to an embodiment, heated to the selected temperature for stabilization of the stucco. Heating can be accomplished before or after addition of water.

According to an embodiment, before introducing water and maintaining the moistened stucco at the selected temperature according to the claimed method, the fresh stucco is heated to the selected temperature as used in the claimed method, e.g. to a temperature of at least 30° C. According to an embodiment, the fresh stucco is heated to a temperature of more than 30° C. to compensate for cooling that occurs during addition of the water to obtain moistened stucco.

Heating can be accomplished by suitable heating equipment, e.g. a mixer equipped with a heating equipment. According to an embodiment heating is achieved by introducing steam into the fresh stucco, wherein the steam is heated to a temperature of at least 100° C., according to a further embodiment to at least 140° C. Care has to be taken that the amount of humidity introduced by the steam does not become too high and, in particular, condensation of the steam resulting in high local amounts of liquid water is avoided.

According to an embodiment of the claimed method, the moistened stucco is kept under a humid atmosphere while being maintained at the selected temperature for a particular time period.

As already discussed above, according to an embodiment, the moistened stucco is maintained under an atmosphere of at least 50% rel. humidity, according to a further embodiment under an atmosphere of at least 70% rel. humidity.

While the moistened stucco is maintained at a temperature of at least 30° C. for at least 30 minutes, the moistened stucco according to an embodiment is agitated to homogenize the moistened stucco. By agitating the moistened stucco, a temperature gradient within the container is avoided as far as possible such that all moistened stucco contained in the container experiences homogeneous reaction conditions and therefore a homogeneous healing rate, such that a homogeneous stabilized stucco is achieved.

According to an embodiment, the amount of water added to the fresh stucco is such that the stabilized stucco contains free moisture in an amount of at least 0.2 wt. %, according to a further embodiment in an amount of at least 0.5 wt. %. According to an embodiment, the stabilized stucco contains free moisture in an amount of less than 5 wt. %, according to a further embodiment of less than 3 wt. %, according to yet another embodiment of less than 1.5 wt. % with respect to the mass of the stabilized stucco. This free moisture is formed by water molecules absorbed on the surface of the stabilized stucco and contained e.g. in very small fissures present in the stucco particles or in spaces provided in the crystal structure of the calcium sulfate hemihydrate crystals. This water is physically bound and is comprised in the stabilized stucco additionally to the water bound in the calcium sulfate hemihydrate.

The stabilized stucco can be ground, to produce fresh crystal surfaces to thereby increase the activity of the stucco.

The stabilized stucco can be dried to adjust humidity of the stabilized stucco.

To adjust activity and other parameters of the stabilized stucco, the stabilized stucco according to an embodiment can be mixed with fillers, e.g. limestone, anhydrite II or clays, or, according to an embodiment, can be mixed with fresh stucco, i.e. stucco that has not be stabilized, to reduce e.g. setting time, if desired.

The stabilized stucco obtained by the method of the invention can be used in all applications for calcium sulfate known from the state of the art. The stabilized stucco is added to water to obtain a slurry that can be further processed, e.g. in the production of plasterboards.

According to an embodiment, the slurry prepared from the stabilized stucco has a setting time of less than 10 minutes, according to a further embodiment of less than 8 minutes and according to a still further embodiment of less than 5 minutes. According to an embodiment, the slurry has a setting time of at least 1 minute, according to a further embodiment of at least 2 minutes, and according to a further embodiment of at least 4 minutes.

According to a further aspect the invention pertains to a method for producing gypsum plasterboards, at least comprising the following steps:
  providing a stabilized stucco obtained by the method as described above;
  preparing a stucco slurry by addition of water to the stabilized stucco;
  forming the stucco slurry to obtain a gypsum plasterboard.

The method basically follows methods known from the state of the art wherein, however, a stabilized stucco as obtained by the method as described above is used. The stabilized stucco is processed in basically the same way as in known methods for the production of gypsum plasterboards. However, due to the lower water demand of the stabilized stucco, the amount of water added to the stabilized stucco is adapted accordingly. The amount of water added to the stabilized stucco can be determined by the skilled person by known methods. For example to obtain a stucco slurry of about the same characteristics and processability as in the known methods, the water-gypsum value, the slurry consistency and/or the flow value can be adjusted by choosing the amount of water used for preparation of the stucco slurry accordingly.

For adjustment of the characteristics of the stucco slurry additives known from the state of the art can be added according to an embodiment. According to an embodiment, a liquefier as known from the state of the art and available on the market can be added to the stucco slurry. Suitable liquefiers are e.g. melamine resins, polycarboxylates, or cellulose partial hydrolysates. The amount of liquefier added to the stucco slurry is determined by known methods, e.g. water-gypsum-value, slurry consistency, flow value. The amount of liquefier is depending on the characteristics of the stucco and has to be determined individually.

According to an embodiment, a foam is added to the stucco slurry. Known foaming agents as available on the market and used in the art of gypsum plasterboard production can be used. Exemplary suppliers of foaming agents for gypsum plaster production are Sika Deutschland GmbH, Leimen, Berolan GmbH, Arbing, D E, Kao Corp., J P. The foaming agents allow a modification of the specific weight or of the weight per unit area of the gypsum plasterboards. The amount of foaming agent added to the stucco slurry is depending on the type of foaming agent used, i.e. the surfactant used, the desired weight per unit area of the gypsum plasterboard and the impact resistance required for the gypsum plasterboard, e.g. determined by the flexural breaking load and e-modulus.

Addition of foam to the stucco slurry induces the presence of pores in the gypsum layer of the gypsum plasterboard after setting. The size of the pores is determined by the size of the bubbles comprised in the foam. Use of stable foams induces formation of small pores in the gypsum layer. A stable foam is understood to be a foam wherein the bubbles basically do not collapse upon contact with the stucco slurry.

According to a further embodiment, a foaming agent is added to the stucco slurry, the foaming agent producing unstable foam. Unstable foam bubbles collapse upon contact with the stucco slurry such that larger bubbles are formed. This results in plasterboards having larger pores with broader partition walls arranged between neighboring pores. The average pore diameter of foam generated pores found in a gypsum layers according to an embodiment is within a range of 50 µm to 2 mm, according to a further embodiment within a range of 100 µm to 1.5 mm.

Larger pores can also be induced by the simultaneous addition of a stable foam and a defoamer. The addition of foam and defoamer can be performed one after the other or both components are added at the same time. According to an embodiment, first the stable foam is added to the stucco slurry and after distribution of the foam in the stucco slurry, the defoamer is added. Commercially available defoamers can be used.

Surprisingly, it has been found that the amount of foaming agent required for a defined porosity of the finished plasterboard could be strongly reduced if stabilized stucco according to the invention is used to produce the board.

As used herein, the term average pore size (also used is the average pore diameter) is calculated from the largest diameter of individual pores in the core. The largest diameter is the same as the Feret diameter. The largest diameter of each pore can be obtained from an image of a sample. Images can be taken using any suitable technique, such as scanning electron microscopy (SEM), which provides two-dimensional images. A large number of pore sizes can be measured in a SEM image, such that the randomness of the cross sections (pores) of the pores can provide the average diameter. Taking measurements of pores in multiple images randomly situated throughout the core of a sample can improve this calculation. Additionally, building a three-dimensional stereological model of the core based on several two-dimensional SEM images can also improve the calculation of the average pore size. Another technique is X-ray CT-scanning analysis (XMT), which provides a three-dimensional image. Another technique is optical microscopy, where light contrasting can be used to assist in determining, e.g., the depth of pores. The pores can be measured either manually or by using image analysis software, e.g., Image!, developed by N1H. One of ordinary skill in the art will appreciate that manual determination of pores sizes and distribution from the images can be determined by visual observation of dimensions of each pore. The sample can be obtained by sectioning a gypsum board.

Stabilized stucco, produced according to the invention can be used for all gypsum products conventionally produced from stucco. It is especially useful for the production of gypsum building boards, e.g. plasterboards or fiberboards, as well as for gypsum blocks, screeds, especially self-levelling floor screeds, jointing compounds, finishing compounds, wall plaster, molding plaster or any other gypsum based product.

The invention will be described in further detail with reference to the following examples.

EXAMPLES

Description of Test Methods:
Gypsum Phase Analysis:

The individual calcium sulfate varieties in the samples, i.e. dihydrate, hemihydrate, anhydrite (III), free water, and other materials were identified through a gravimetric gypsum phase analysis procedure as follows:

Anhydrite III (A III; Water-Soluble Anhydrite) and Free Moisture $$CaSO_4(III)+0.5H_2O \rightarrow CaSO_4 \cdot 0.5H_2O$$

About 7 g sample are weighed in a porcelain crucible ($W_A$). The weighed crucible is left overnight in a drying cabinet at 40° C. Subsequently, the sample in the crucible was heated to 80° C. and dried at this temperature for another 2 hours. The crucible is then transferred into a desiccator for cooling to room temperature. The crucible is then weighed ($W_B$).

An increase in weight corresponds to anhydrite III and a decrease in weight is considered free moisture.

Anhydrite III [%]=$[(W_B-W_A)/(W_A-W_{crucible})] \times 15.11 \times 100$

Free moisture [%]=$[(W_A-W_B)/(W_A-W_{crucible})] \times 100$

Calcium Sulfate Hemihydrate (HH)

$$CaSO_4 \cdot 0.5H_2O + 1.5H_2O \rightarrow CaSO_4 \cdot 2H_2O$$

About 7 g sample are weighed in a porcelain crucible ($W_C$). Deionized water is added in an amount that the sample is thoroughly wetted and is just covered with water. After 60 minutes waiting time the crucible is transferred into a drying cabinet and dried at 40° C. until constant weight. The crucible is then transferred into a desiccator for cooling to room temperature. The crucible is weighed ($W_D$) and the amount of calcium sulfate hemihydrate is calculated from the increase of weight.

a) $(W_B)>(W_A)$

HH [%]=$\{[(W_D-W_C)/(W_C-W_{crucible})]-4[(W_B-W_A)/(W_A-W_{crucible})]\} \times 5.37 \times 100$ b) $(W_A)>(W_B)$ HH [%]=$\{[(W_D-W_C)/(W_C-W_{crucible})]+[(W_A-W_B)/=W_A-W_{crucible})]\} \times 5.37 \times 100$ Anhydrite II (Sparingly Soluble Anhydrite) (a II-s)

$$CaSO_4(II\text{-}s) + 2H_2O \rightarrow CaSO_4 \cdot 2H_2O$$

Determination of anhydrite II follows the method for determination of calcium sulfate hemihydrate. About 7 g sample are weighed in a porcelain crucible ($W_E$). The sample is thoroughly wetted with deionized water and is then kept in a desiccator for 72 hours. The crucible is then transferred into a drying cabinet heated to 40° C. until constant weight. The crucible is then cooled to room temperature in a desiccator and weighed ($W_F$).

A II-s[%]=$\{[(W_F-W_E)/(W_E-W_{crucible})]-[(W_D-W_C)/(W_C-W_{crucible})]\} \times 3.78 \times 100$ Water of Crystallization ($W_k$)

A weighed crucible ($W_a$) is filled to about ¾ of its volume with a sample and the filled crucible is weighed again ($W_b$). The crucible is then transferred into a muffle furnace to be heated to 330 to 360° C. for 60 minutes. The crucible is transferred into a desiccator for cooling to room temperature and then is weighed again ($W_c$).

For determination of free moisture a sample is dried at 80° C. in a drying cabinet and the free moisture is calculated (F [%]).

From the weight difference is calculated the amount of crystal water.

a. No Free Moisture Found $W_k[\%]=\{[(W_b-W_c)/(W_b-W_a)] \times 100$ b. Free Moisture Detected $W_k[\%]=\{\{[(W_b-W_c)/(W_b-W_a) \times 100]-(F[\%])\}/(100-F[\%])\} \times 100$ For a more detailed determination the sample is analyzed by X-ray diffraction.

Particle Size Analysis

Particle size distribution was determined using a Malvern Mastersizer 2000 (Herrenberg, Germany). The test was conducted by dispersing the sample in a solution of isopropyl alcohol in a wet dispersion unit operating at 2350 RPM. A material density setting of "gypsum (avg)" was assumed and the measurement was performed at between 10 and 20 obscuration, after background subtraction.

Flow Value

A stucco sample (400 g) was added over 30 seconds to room temperature equilibrated water containing 1.0 g of sodium citrate, in a blender (Kitchen Aid) followed by blending for 7 seconds at the highest speed. The amount of water is determined according to the water gypsum value. The blended slurry was then poured into a brass cylinder (5 cm diameter, 10 cm tall) put on a clean glass plate. 50 sec after adding the brass cylinder was lifted in a swift vertical motion allowing the slurry to spread into a patty. The flow value was determined by determining the diameter of the patty.

Setting Time

The sample was prepared as described for the determination of the flow value but without addition of sodium citrate and poured into a hard rubber ring (height 40 mm). Initial setting and final setting were determined with modified Vicat instrument (according to DIN EN 13279-2). At a penetration depth <40 mm initial setting was reached. For final setting the falling weight was increased by 1 kg. Final setting was reached at a penetration depth of 8 mm.

Blaine Specific Surface Area

The specific surface area according to Blaine was determined according to DIN EN 196-6.

Disintegration

Determination of the Degree of Disintegration

Around 150 to 200 ml of mixer slurry (i.e. sampled directly before the slurry is applied onto the liner during the production process) poured into a powder flask which has been filled with 300 ml spirit (94 to 96%). The powder flask is firmly closed and then is shaken vigorously.

The entire contents of the flask are poured in a large Buchner funnel (Ø 180 mm) equipped with a Sartorius filter paper 392 and vacuum is applied to suck off the liquid phase. The suctioning should be flat and rapid.

A filter patty is placed in a powder flask filled with 200 ml acetone. The powder flask is closed well and its content is shaken vigorously. The suspension is filtered through the Sartorius filter paper 392 and the filter cake is rinse with acetone.

The filter cake is transferred onto a watch-glass and then dried at 40° C. in the drying cabinet until constant weight.

The dry material is sieved off a 0.2 mm sieve. Agglomerates are gently pressed through the sieve with a brush. Then the sieve residue and the sieve passing are homogenized. Afterwards the Blaine value is determined and a particle size analysis is carried out.

Calculation of the Disintegration Factor—De

De=Blaine value of disintegrated sample/Blaine value of fresh sample

Compressive Strength:

The compressive strength was determined according to DIN EN 13279-2.

Water-Gypsum-Value

The water-gypsum-value was determined according to DIN EN 13279-2

BET-Surface Area

The specific surface area was determined with a Flow Sorb 2300 II (Micromeritics) by the BET-method with nitrogen with the single point method according to DIN 61131.

Rehydration

A weighed sample (about 7 g) comprising known amounts of calcium sulfate hemihydrate and dihydrate was suspended in water (20 ml) and left at room temperature. A stop watch is started when the sample is added to the water. Samples were taken at defined time intervals.

Samples were taken approximately 1 minute before elapse of the pre-defined time interval, transferred into the mortar and crushed with the pestle. After the time interval has elapsed, around 100 ml of spirit (94 to 96%) is poured into the mortar and crushing is continued.

A filter paper is placed in a Buchner funnel and moistened with water and then rinsed with spirit. The finely crushed mortar is transferred on the filter paper and the liquid phase is sucked off by applying reduced pressure to the Buchner funnel. The filter cake is rinsed again with spirit and then with acetone to remove residual water. The filter patty is placed on a watch glass and dried in a drying cabinet at 40° C. until constant weight. The amount of water of crystallization is determined as described above.

Calculation

Rehydration degree [%]=Water of crystallization [%]×4.7785

Slurry Consistency/Splat Test

A splat tester (drop consistometer) comprises a hollow funnel with a height of 60 mm, a lower inner diameter of 70 mm and an upper inner diameter of 100 mm. The lower opening can be locked with a plate that can be swung away to open the lower opening of the funnel. The cone is slidably fixed to a vertical rod fixed on a base plate to adjust a drop height of 125 mm. The drop height is the distance between the lower opening of the funnel and the base plate.

A stop watch is started with the start of the slurry preparation. The slurry is filled into the funnel locked at its bottom side with the plate. Excess material is scrapped off with a knife (spatula with a hammer head).

After 10 seconds the plate is swung away from the funnel such that a slurry cake can fall onto the base plate.

The diameter of the patty is determined in two vertically opposed directions and the average is calculated.

Example 1

Fresh stucco was continuously delivered from a calcination aggregate to a blender equipped with a nozzle for introducing steam and a stirrer for agitating the stucco. Dosage was adjusted to 30 kg/min. Steam was introduced in a rate of 2 wt. % steam based on the weight of the fresh stucco in order to obtain moistened stucco. The moistened stucco was then transferred into a container heated to a temperature of 80° C. without agitation. Samples were taken immediately after the sample had left the blender after hydration (0 h), after 4 h treatment at 80° C. and after 24 h treatment at 80° C. The flow value was determined as described above.

The results are summarized in table 1

TABLE 1 flow value of a moistened stucco sample after treatment with 2 wt. % steam and storage at 80° C.

| | T of fresh stucco ° C. | Temperature after blender ° C. | flow value (mm) | | |
|---|---|---|---|---|---|
| | | | 0 h | 4 h | 24 h |
| No steam | 66 | 43 | 269 | n.d. | n.d. |
| 2% steam | 73 | 93 | 283 | 338 | 380 |
| No steam | 33 | 37 | 262 | n.d. | n.d. |
| 2% steam | 33 | 71 | 299 | 380 | 409 |

The temperature of the fresh stucco as introduced into the blender has no influence on the healing of the stucco. In both experiments using fresh stucco having a temperature of 66° C. and 33° C., respectively, but without a steam treatment, about the same flow value was obtained from the stucco sampled after the blender. Flow values of 269 mm and 262 mm were obtained for these samples.

By introducing steam into the blender, an increase in the flow value is observed already immediately after the steam treatment. The increase in flow value is caused by healing processes of the calcium sulfate hemihydrate. After storage of the moistened stucco samples at 80° C. a significant increase in the flow value is observed. After 4 hours treatment time an increase to 338 mm and 380 mm, respectively, is observed. After 24 h treatment a further increase of the flow value in both samples is observed.

The influence of the storage time and the temperature applied during storage on the flow value is summarized in table 2.

TABLE 2 flow value of moistened stucco samples (water-gypsum-value "WGW" = 0.70)

|  | flow value (mm) |
|---|---|
| Immediately after steam treatment (2 wt. %) | 282 |
| 24 h storage at room temperature | 290 |
| 24 h storage at 80° C. | 380 |
| 96 h storage at 80° C. | 383 |

When after steam treatment the sample was stored at room temperature, the flow value almost remained the same.

Only a slight increase from 282 mm obtained immediately after steam treatment to 290 mm after 24 h storage at room temperature was observed.

A significant increase in flow value corresponding to healing of the stucco sample is observed after storage at 80° C. After 24 h an increase from 282 mm to 380 mm is observed. After 24 hours storage, the healing process is basically completed. After a total storage time of 96 h at 80° C. almost no further increase in flow value was observed.

Example 2: Large-Scale Stabilization of Stucco

For a large-scale experiment, the stucco storage container of a production line was equipped with an electric heating placed on the outer wall of the silo and an insulation layer surrounding the silo on the outside. A pre-mixing unit for conveying the stucco into the storage container was equipped with inlets for water and for steam. The gypsum used for calcination in stucco production was a 50:50 (w/w) mixture of mined gypsum and gypsum obtained from flue gas desulfurization.

53 tons of fresh stucco having a temperature of 82° C. were treated in a continuous mixer by addition of 1.4 wt. % water and 0.25 wt. % steam to obtain a moistened stucco. The moistened stucco was transported to a storing container provided with an isolation layer surrounding all outer surfaces of the container. The temperature of the moistened stucco before being filled into the storing container was 75±5° C. The storing container was closed airtight and the moistened stucco was stored for 3 hours for stabilization. After stabilization the stabilized stucco was removed from the storing container to be processed to gypsum plasterboards on a standard conveying line. The temperature of the stabilized stucco when removed from the storing container was >65° C.

For control, a sample of the moistened stucco was taken immediately after addition of water and steam to the fresh stucco. The sample was transferred to a drying cabinet and was stored at 80° C.

The flow value of the samples was determined by the method described above. For determination of the flow value, the stucco samples were mixed with deionized water at a water-gypsum value (WGW) of 0.64:

The properties of the samples are summarized in table 3.

TABLE 3

Stabilization of fresh stucco

|  | Fresh stucco | Moistened stucco stabilized at 80° C. in drying cabinet | Moistened stucco stabilized in storing container at 75° C. |
|---|---|---|---|
| Free moisture (wt. %) | 0.0 | 1.1 | 0.8 |
| Hemihydrate (wt. %) | 83.5 | 82.7 | 83.1 |
| Crystal water (wt. %) | 5.76 | 6.62 | 6.38 |
| Dihydrate (wt. %) | n.d. | 0.09 | 0.36 |
| Blaine (cm$^2$/g) | 4788 | 4722 | 4632 |
| BET (m$^2$/g) | 7.7 | 3.7 | 3.9 |
| D$_{50}$ (µm) | 29.9 | 28.5 | 30.9 |
| Flow value (mm) | | | |
| 0 h | 140 | 295 |  |
| 1 h |  | 360 |  |
| 2 h |  | 375 |  |
| 3 h |  |  | 355 |
| 24 h |  | 395 |  |

A significant stabilization of the stucco could be achieved. After 3 hours storage in a storing container at about 75° C. an increase in the flow value from 140 mm for the fresh stucco to 360 mm for the stabilized stucco could be observed.

Stabilization of the moistened stucco under large scale conditions in a storing container was significant. A small scale sample stabilized under laboratory conditions in a drying cabinet had a flow value of 360 mm after 1 hour stabilization. After 24 h storage the laboratory scale sample had a flow value of 395 mm.

The stabilization effect could also be observed in the significantly reduced disintegration of the samples. Whereas the fresh stucco had a disintegration of 2.24, after stabilization treatment the disintegration was reduced to 1.76.

Example 3: Preparation of Stucco Slurry

The stabilized stucco obtained in example 4 after storage in a storage container at 75° C. was used for preparation of a stucco slurry in an industrial production line.

The stabilized stucco was mixed with water and liquefier was added to adjust viscosity of the stucco slurry. Amounts of water and liquefier were adjusted such that viscosity of the stucco slurry corresponds to the viscosity of a stucco slurry as used in a standard large scale gypsum plaster production line.

After storing the stabilized stucco was mixed with water and a liquefier was added. The gypsum plasterboards produced had a thickness of 12.4 was obtained at standard production conditions.

The data obtained for the stabilized stucco slurry are summarized in table 4. For comparison also the data for a standard gypsum plaster production line are included in table 4.

TABLE 4 data on stucco slurry

|  | Standard production line | Stabilized stucco |
|---|---|---|
| Water-gypsum value | 0.69 | 0.65 |
| Liquefier (ml/m$^2$) | 48.8 | 13.3 |
| Setting (initial/final) | —/3:10 min | 30 s/3.25 min |
| Slurry consistency (mm) Splat test | 205 | 205 |
| Rehydration (%) | | |
| 10 min |  | 84.77 |
| 20 min |  | 87.83 |
| 24 h |  | 89.84 |
| Efficiency (%) |  | 94.4 |
| Blaine (cm$^2$/g) |  | 8163 |
| disintegration | 2.24 | 1.76 |
| $D_{50}$ | — | 26.3 |

For achieving about the same setting times and slurry consistency as used for a standard gypsum plaster production line, the amount of water and liquefier comprised in the slurry using the stabilized stucco could be significantly reduced. The water-gypsum-value can be reduced from 0.69 for the standard production to 0.65 when using stucco that has been healed at higher temperature for a longer time period.

The low grade of disintegration reflects the lower grain disintegration achieved by healing. The lower disintegration results in a lower water demand of the stucco when used e.g. for gypsum plasterboard production.

Example 4: Production of Gypsum Plasterboards

The stucco slurry obtained in example 3 was used for production of gypsum plasterboards of a thickness of 12.5 mm in a standard production line. The properties of the gypsum plasterboards are summarized in table 5. For comparison also the parameters for a standard production line are included. The weight of the boards, the flexural breaking load and the e-modulus were determined according DIN 18180. SSL: face side long; RSQ: rear side cross; the terms are explained in detail in DIN 18180.

TABLE 5 properties of gypsum plasterboards

|  | Standard production line | | Example 4 | |
|---|---|---|---|---|
|  | SSL | RSQ | SSL | RSQ |
| Weight per unit area (kg/m$^2$) | 8.5 kg/m$^2$ | | 8.5 kg/m$^2$ | |
| Flexural breaking load (N) | 615 | 249 | 602 | 232 |
| e-modulus (N/mm$^2$) | 3178 | 2545 | 2894 | 2174 |
| Adhesion to cardboard liner | | | | |
| Wet | 1/1 | | 1/1 | |
| Dry | 1/1 | | 1/1 | |
| 24 h humid atmosphere | 1/1 | | 1/1 | |

TABLE 5-continued properties of gypsum plasterboards

|  | Standard production line | | Example 4 | |
|---|---|---|---|---|
|  | SSL | RSQ | SSL | RSQ |
| Rehydration (%) | | | | |
| After dryer |  | 85.4 |  | 81.6 |
| Hydrated |  | 89.0 |  | 87.7 |
| Efficiency (%) |  | 95.6 |  | 93.0 |

The adhesion of the cardboard layer was evaluated by an internal evaluation method assigning grades 1 to 5. A slit is cut crosswise into the cardboard liner with a sharp knife and then the cardboard liner is torn off from the underlying gypsum layer by tearing at one corner formed at the slit intersection. Grade 1 is assigned if the adhesion of the cardboard to the gypsum layer is so strong that the cardboard liner is slit with the side adhering to the gypsum layer remaining firmly bound and the upper side of the cardboard liner being ripped off. Grade 5 is assigned, if the cardboard liner can be ripped off the gypsum layer completely with no cardboard residues remaining on the gypsum layer surface. Gypsum plasterboards have to be assigned grades 1 or 2 in the test to be released for sale to customers.

Quality requirements for quality of gypsum plasterboards:

| DIN EN 18180 | SSL | RSQ |
|---|---|---|
| Flexural breaking load (N) | >610 | >210 |
| e-modulus (N/mm$^2$) | >2800 | >2200 |

The adhesion of gypsum core made from the stabilized stucco slurry to the liner was equivalent to gypsum plasterboards obtained in the standard production line, both immediately after application of the stucco slurry onto the liner but after the cutting station and after drying.

The amount of water which had to be evaporated from the gypsum boards in the dryer could be reduced on average by 8%. The amount of liquefier necessary for a homogeneous distribution of the slurry on the linier could even be reduced by 73% compared to plasterboard production with conventionally used stucco.

For evaluation of the rehydration, a sample taken after the dryer was stored in room temperature water for 24 hours. Subsequently, the absorbed water was evaporated. The water of crystallization was determined as described above. The amount of water of crystallization determined was considered as 100% rehydration and the rehydration efficiency was calculated therefrom.

Degree of Healing

The degree of healing achieved by the method of the invention was determined from the flow value. The following flow values were determined:

$F_{SS}$: flow value determined after storage of stabilized stucco for less than 24 hours;

$F_{ST}$: flow value determined for stucco processed in standard process; sample is taken after the pre-mixer, immediately after addition of water for forced aging;

$F_{80° C., 24 h}$: flow value determined for stucco sample aged for 24 h in a steam-tight container in a drying cabinet at 80° C. (considered as received maximum healing grade possible)

The degree of healing was then calculated by equitation:

$$\text{Degree of healing (\%)} = [(F_{SS} - F_{ST})/(F_{80°C, 24h} - F_{ST})] \times 100$$

The flow values found are summarized table 6:

TABLE 6 flow values for determination of healing degree

| $F_{SS}$ | $F_{ST}$ | $F_{80°C, 24h}$ |
|---|---|---|
| 357.5 mm | 295 mm | 395 mm |

A healing degree of 63% was determined.

Example 5: Large-Scale Stabilization of Stucco

For a further large-scale experiment, the same equipment as in example 2 was used. The gypsum used for stucco production was a 50:50 (w/w) mixture of mined gypsum and gypsum obtained from flue gas desulfurization.

The amount of stucco was 60 t which were processed within 150 minutes. The temperature of the fresh stucco was 85° C. Water was added in an amount of 1.5 wt. %. The temperature of the stucco during storage in the silo was 75±5° C. The temperature of the stucco after storage and before addition of water and liquefier was >65° C. The gypsum plasterboards produced had a thickness of 12.5 mm.

The features of the stucco obtained are summarized in table 7. For comparison also the features of stucco obtained in a standard industrial production line, without stabilization of the stucco by aging at elevated temperature, are included.

Example 6: Preparation of Stucco Slurry

The stucco obtained after aging in example 5 was used for the preparation of stucco slurry.

For generation of pores commercially available foaming agents were used. For generation of small pores a foaming agent for stable foam was used (example 6.1 and 6.2). For generation of larger pores and broader partition walls between pores the in the gypsum a foaming agent for stable foam in combination with a defoaming agent was used. As an alternative embodiment for generation of larger pores a commercially available foaming agent for an unstable foam was used (example 6.4). Upon contact with the stucco slurry, small bubbles formed collapsed thereby forming larger bubbles effecting larger pores.

The data of the stucco slurries are summarized in table 8. For comparison also the data for a standard gypsum plaster production are included.

TABLE 7 features of stucco after aging at elevated temperature

| | Standard production | | Example 5 | | |
|---|---|---|---|---|---|
| | | | | Moistened stucco stabilized at 80° C. in | Moistened stucco stabilized in storing |
| sample | Before pre-mixing unit | After pre-mixing unit | Fresh stucco | drying cabinet | container at 65° C. |
| A-III (wt. %) | — | — | 1.5 | — | — |
| Humidity (wt. %) | 0.1 | 1.0 | 0.0 | 1.1 | 0.9 |
| HH (wt. %) | 85.1 | 84.9 | 83.4 | 85.9 | 85.9 |
| A-II (wt. %) | 0.7 | — | 1.5 | — | — |
| $W_k$ (wt. %) | 5.9 | 6.7 | 5.9 | 6.9 | 6.7 |
| DH (wt. %) | 0.11 | — | — | 0.15 | — |
| Blaine (cm²/g) | 3389 | 3040 | 3791 | 4099 | 4272 |
| BET (m²/g) | 7.6 | | | 3.5 | 3.8 |
| Flow value (mm) | | | | | |
| 0 h | | | 160 | 285 | |
| 1 h | | | | 360 | |
| 2 h | | | | 380 | |
| 3 h | | | | | 349 |
| 24 h | | | | 395 | |

TABLE 8

Composition of stucco slurry used for production of gypsum plasterboards

|  | Standard | Ex. 6.1 | Ex.6.2 | Ex.6.3 | Ex.6.4 |
|---|---|---|---|---|---|
| Stabilized stucco (wt. %) | 0 | 100 | 80 | 100 | 100 |
| Fresh stucco (wt. %) | 100 | 0 | 20 | 0 | 0 |
| WGV | 0.69 | 0.65 | 0.65 | 0.65 | 0.65 |
| Foaming agent | stable | stable | stable | stable | unstable |
| Amount (ml/m$^2$) | 1.4 | 1.35 | 1.4 | 2.3 | 3.4 |
| Liquefier (ml/m$^2$) | 48 | 13.2 | 21.2 | 8.9 | 10.8 |
| Accelerator(g/m$^2$) | 116 | 104 | 104 | 110 | 109 |
| Defoaming agent | — | — | — | 17.8 g/m$^2$ | — |
| Setting (min) (initial/final) | —/3:15 | 0:25/3:00 | 0:20/2:55 | 0:25/2:50 | 0:25/2:50 |
| Splat test (mm) | 180 | 200 | 180 | 180 | 180 |
| Rehydration (%) | | | | | |
| 10 min | 87.4 | 87.3 | 87.2 | | |
| 20 min | 90.8 | 89.7 | 87.8 | | |
| 24 h | 93.2 | 92.1 | 92.0 | | |
| Blaine | 11430 | 7783 | 8437 | | |
| Disintegration | 3.76 | 1.82 | 1.91 | | |
| D$_{50}$ | 21.2 | 25.4 | 23.3 | | |

Accelerator: ground calcium sulfate dihydrate
Liquefier: Sodium-Naphthalin-Sulfonate Example 7: Reduced Water and Foaming Agent Consumption The amount of the foaming agent necessary to produce a plasterboard of a defined density generally varies with the quality (natural, synthetic, amount and kind of impurities, kind of calcination, grain size etc.) of the used stucco. These parameters can change from day to day so that for each experiment a "standard plasterboard", produced immediately before the samples were taken, was sampled as a reference. Identical foaming agents were used for the production of the standard and the experimental boards. The difference between the amount of foaming agent used for the standard board and for the board according to the example was designated as A, see tab. 9. All boards produced, standard boards as well as experimental boards, have a mass per unit area of 8.5 kg/m$^2$ and the size of 1.25 m×2 m×12.5 mm.

The amount of water for slurry generation as well as the amount of liquefier were reduced by identical amounts in all samples produced with a stucco according to the invention compared to the standard production. The reductions were necessary to achieve the flow values optimal for production on the respective production line. Since the amount of reduction was identical in all samples, it is not further detailed.

TABLE 9

Relative reduction in necessary foaming agent amount as a result of storing time during stabilization

|  | Ex. 7.1 | Ex. 7.2 | Ex. 7.3 | Ex. 7.4 |
|---|---|---|---|---|
| Δ Foaming agent (wt. %) | 15 | 15 | 5 | 2 |
| Storing time for stabilization (hours) | 24 | 24 | <3 | <3 |

From the values in Tab. 9 it becomes apparent that longer storing times for stabilization enable the production of boards with the same density as the standard boards but having to use considerably lower amounts of the foaming agent, and thereby significantly reducing overall costs.

Example 8: Preparation of Gypsum Plasterboards

The stucco slurry obtained in examples 6.1 to 6.4 was used in a standard industrial production line for production of gypsum plasterboards. The properties of the obtained gypsum plasterboards are summarized in table 10. The weight of the gypsum plasterboards, the flexural breaking load and the e-modulus were determined according to DIN 18180. The adhesion of the liner to the gypsum layer was determined as described in example 4. Rehydration was determined as described above.

TABLE 10 properties of gypsum plasterboards

| Example | standard | 8.1 | 8.2 | 8.3 | 8.4 |
|---|---|---|---|---|---|
| Stucco slurry according to example | standard | 6.1 | 6.2 | 6.3 | 6.4 |
| Weight per unit area (kg/m$^2$) | 8.53 | 8.58 | 8.49 | 8.64 | 8.52 |

TABLE 10-continued

| | properties of gypsum plasterboards | | | | | | | | | |
|---|---|---|---|---|---|---|---|---|---|---|
| | SSL | RSQ | SSL | RSQ | SSL | RSQ | SSL | RSQ | SSL | RSQ |
| Flexural breaking load (N) | 619 | 237 | 606 | 242 | 613 | 240 | 615 | 239 | 636 | 243 |
| e-modulus (N/mm$^2$) | 2841 | 2320 | 2705 | 2168 | 2787 | 2210 | 2951 | 2317 | 3062 | 2318 |
| | Adhesion to cardboard liner | | | | | | | | | |
| Wet | 1/1 | | 1/1 | | 1/1 | | 1/1 | | 1/1 | |
| Dry | 1/1 | | 1-2/1-2 | | 1/1 | | 1/1 | | 1/1 | |
| 24 h humid atmosphere | 1/1 | | 2-3/1-3 | | 1/1 | | 1/1 | | 1/1 | |
| | Rehydration (%) | | | | | | | | | |
| After dryer | 85.5 | | 82.9 | | 83.1 | | 84.3 | | 83.4 | |
| Hydrated* | 91.1 | | 89.8 | | 90.8 | | 90.3 | | 91.5 | |
| Efficiency | 93.8 | | 92.3 | | 91.5 | | 93.4 | | 91.1 | |

*after 24 hours of water immersion

Degree of Healing

The flow values determined are summarized in table 11:

TABLE 11

| flow values for determination of healing degree | | |
|---|---|---|
| $F_{SS}$ | $F_{ST}$ | $F_{80° C., 24 h}$ |
| 349.5 mm | 285 mm | 395 mm |

A healing degree of 59% was determined.

The invention claimed is:

1. Method for stabilizing stucco wherein
a fresh stucco is provided at a temperature of at least 50° C.;
water is added to the fresh stucco to obtain moistened stucco, and
maintaining the moistened stucco at a temperature of at least 75° C. and less than 90° C. for a time interval of at least 30 min and less than 24 hours to obtain a stabilized stucco, wherein water is added to the fresh stucco in an amount such that the stabilized stucco contains free moisture in an amount of less than 3 wt. %, based on the weight of the stabilized stucco, and wherein no heating of the moistened stucco using an external device occurs.

2. Method according to claim 1, wherein the water is provided in vapor form.

3. Method according to claim 1, wherein the moistened stucco is maintained under an atmosphere of at least 50% rel. humidity.

4. Method according to claim 1, wherein a particle size D98 of the stabilized stucco is adjusted to less than 1 mm.

5. Method according to claim 1, wherein the stabilized stucco is ground.

6. Method according to claim 1, wherein the stabilized stucco is mixed with fresh stucco.

7. Method according to claim 1, wherein water is added to the fresh stucco in an amount such that the stabilized stucco contains free moisture in an amount of 0.5 to 1.5 wt. % based on the weight of the stabilized stucco.

* * * * *